United States Patent [19]
Wellner et al.

[11] Patent Number: 6,067,112
[45] Date of Patent: May 23, 2000

[54] INTERACTIVE DESKTOP DISPLAY SYSTEM FOR AUTOMATICALLY ADJUSTING PAN AND ZOOM FUNCTIONS IN RESPONSE TO USER ADJUSTMENT OF A FEEDBACK IMAGE

[75] Inventors: Pierre D. Wellner; Michael J. Flynn; Kathleen A. Carter; William M. Newman, all of Cambridge, United Kingdom

[73] Assignee: Xerox Corporation, Stamford, Conn.

[21] Appl. No.: 08/869,464

[22] Filed: Jun. 5, 1997

[30] Foreign Application Priority Data

Jul. 12, 1996 [GB] United Kingdom ................... 9614837

[51] Int. Cl.[7] .............................. H04N 5/232; H04N 7/18
[52] U.S. Cl. ........................... 348/211; 348/744; 348/63; 348/333; 348/136
[58] Field of Search ..................................... 348/252, 744, 348/62, 63, 61, 136, 584, 333, 335, 129, 130, 135, 141, 142, 745, 747, 239; 382/294, 299

[56] References Cited

U.S. PATENT DOCUMENTS

| | | | |
|---|---|---|---|
| 4,468,694 | 8/1984 | Edgar | 358/93 |
| 4,502,075 | 2/1985 | De Forest et al. | 358/93 |
| 5,091,066 | 2/1992 | Foá et al. | 204/78 |
| 5,128,525 | 7/1992 | Stearns et al. | 235/454 |
| 5,168,147 | 12/1992 | Bloomberg | 235/456 |
| 5,227,896 | 7/1993 | Ozawa | 358/474 |
| 5,511,148 | 4/1996 | Wellner | 395/106 |
| 5,742,698 | 4/1998 | Minami et al. | 348/745 |
| 5,764,793 | 6/1998 | Omae et al. | 382/149 |

FOREIGN PATENT DOCUMENTS

| | | |
|---|---|---|
| 0 495 622 A2 | 7/1992 | European Pat. Off. . |
| 0 568 161 A1 | 11/1993 | European Pat. Off. . |
| 0 622 722 A2 | 11/1994 | European Pat. Off. . |
| 2 137 043 | 9/1984 | United Kingdom . |
| 2 158 672 | 11/1985 | United Kingdom . |

OTHER PUBLICATIONS

Horowitz, Paul and Winfield Hill. The Art of Electronics, Cambridge University Press, 1980, pp. 673–741.

United Kingdom Search Report for UK counterpart Application No. GB 9614837.4. Dec. 9, 1996.

*Primary Examiner*—Wendy Garber
*Assistant Examiner*—Jacqueline Wilson

[57] ABSTRACT

An interactive desktop system for automatically adjusting pan and zoom functions to change a field of view in response to user actions relative to a feedback image projected on a source document. The interactive desktop system includes an image capture system, a display system and a processor system. The image capture system grabs an image from the source document in its field of view. The display system indicates to a user the captured image using the feedback image, which is visible to the image capture system. In response to a user adjustment of the feedback image, the processor system adjusts either the pan or zoom function of the image capture system, thus changing the field of view of the image capture system.

18 Claims, 7 Drawing Sheets

INTERACTIVE DESKTOP DISPLAY SYSTEM FOR AUTOMATICALLY ADJUSTING PAN AND ZOOM FUNCTIONS IN RESPONSE TO USER ADJUSTMENT OF A FEEDBACK IMAGE

FIELD OF THE INVENTION

The present invention relates to an interactive desktop system. In particular, the present invention relates to an interactive display system that responds to user adjustment of a projected feedback image by automatically adjusting a pan and/or zoom function.

BACKGROUND OF THE INVENTION

A number of desktop camera-projector systems exist. Positioned above a desk or work surface, these systems allow a user to select functions to be performed by selecting items within the field of view of the camera. A video camera or scanner captures images of hardcopy documents on the work surface. Feedback information may be displayed to the user via the projector. Available functions include calculation and translation of data included within documents within the field of view of the camera. One such system is described in European Application EP-A-495,622.

European Application EP-A-622,722 describes another camera-projector system. This system generates new documents by capturing information contained within a hardcopy document including text and/or images. The system captures the information using a camera-projector system directed at the hardcopy document as it resides on a desk. The system also works in conjunction with a printer or copier. The system determines which functions are to be performed based upon input from the user captured by the camera. User input may include pointing at the relevant data or tapping on the surface of the hardcopy document to point out the relevant text or images. The system provides user feedback by projecting an image onto the work surface or on to the hardcopy document itself.

The system described in European Application EP-A-622,722 suffers from a number of disadvantages. The system's projector and camera are large and bulky and must be fixedly mounted. This makes the system difficult to set-up and difficult to move. Many potential users find it impossible to set-up over their existing desks. Furthermore, the camera's field of view is limited and difficult to change. The system also makes it difficult to change the camera zoom. The system's projector has limited resolution and range and a trade-off is required between the two. This is a disadvantage because some user applications, like fine sketching and handwriting, require high resolution per square inch while other user applications, like architectural visualization, require a large surface area and lower resolution per square inch. Any given projection must sacrifice one for the other, either size for resolution or vice versa. Once one has been chosen, modifying that choice is difficult.

Prior camera-projector systems tend to produce low resolution images because of the video cameras used. Text recognition programs within scanners perform poorly when presented with these low resolution images. Given these low resolution images to print, printers produce poor quality documents. One possible solution to these problems when the user is working with relatively small portions of a source document is to zoom the system camera to focus only on the portion of interest. This solution requires that the user be able to control the camera. A user could control the camera by manually adjusting the camera zoom before selecting portion of interest. This is an extra step and requires extra controls and a monitor of some sort so that the user can see "through the camera." These camera controls are independent of display size and resolution. If the user wishes to adjust these other steps and controls are necessary and require choosing between display size and resolution.

SUMMARY OF THE INVENTION

The interactive desktop system of the present invention overcomes a number of disadvantages of prior camera-projector systems. The interactive desktop system of the present invention allows easy and intuitive adjustment of camera pan and zoom functions. The present invention also allows the user to see "through the camera" without looking away from the source of the image to be captured. The interactive desktop system of the present invention also eliminates the need to trade off display object size against display object resolution by increasing display object resolution without changing its size. Additionally, the present invention is easy to set-up on existing work surfaces and easy to move.

The interactive desktop system of the present invention automatically adjusts pan and zoom functions electronically in response to user actions in a field of view relative to a projected feedback image. The interactive desktop system includes an image capture system, a display system and a processor system. The image capture system grabs an image from a source document in its field of view. The captured image may also include images of the user's finger(s) and the feedback image. Electronically controllable pan and zoom functions allow the processor system to adjust the field of view of the image capture system. The display system indicates to a user the captured image using a feedback image projected on the source document that is visible to the image capture system. The display system also uses the captured image to generate a display image, which is projected beside the source document. In response to a user adjustment of the feedback image, the processor system electronically adjusts the pan and/or the zoom function of the image capture system, causing changes in the size and/or location of the feedback image as well as changes in the size of the display image. Changes in the size of the display image do not change the scale of object images within the display image.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
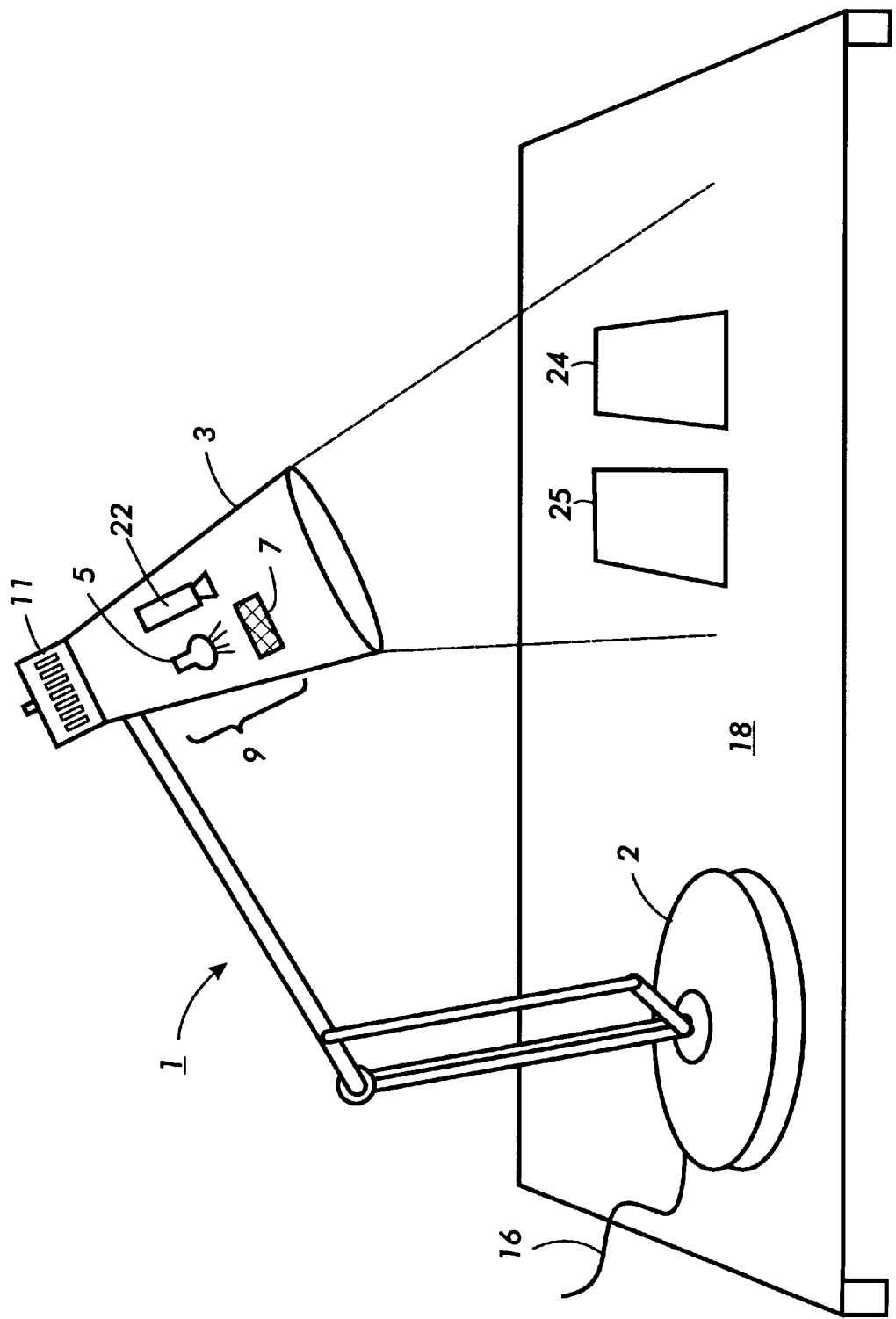
FIG. 1 illustrates one embodiment of the interactive desktop system of the present invention.

FIG. 1 illustrates in block diagram form interactive desktop system 10 of the present invention. Briefly described, interactive desktop system 10 enables a user to easily adjust the field of view of an image capture system. The user adjusts the field of view by manipulating feedback image 130 (illustrated in FIG. 7), which display system 19 projects onto source document 12. Processor system 30 responds to this adjustment by changing the pan and/or zoom of the image capture system, as appropriate. Processor system 30 also instructs display system 19 to change the size and/or move the position of feedback image 130 on source document 12 to indicate that portion of source document 12 now being captured. Processor system 30 does so by executing instructions 150, which will be discussed in detail with respect to FIG. 8.

A. Overview of the Interactive Desktop System

Referring to FIG. 1, interactive desktop system 10 includes the image capture system, display system 19 and processor system 30. The image capture system includes camera 18, which has electronically controllable pan and zoom functions. The image capture system may also include a manual zoom control, like rotary zoom control 23, located near the top of lamp shade 16. Rotary zoom control 23 is similar to those provided on conventional SLR and video cameras, but electronically coupled to processor system 30 to enable the user to control of the zoom setting of camera 18 and thereby to change its field of view. Display system 19 is preferably realized as a video projector including a light source, like bulb 20, and liquid crystal display (LCD) matrix 22. Display system projects display image 14 using the image captured by the image capture system. Display system 19 also projects feedback image 130 onto source document 12. Both display system 19 and the image capture system are controlled by processor system 30, which is discussed herein below with respect to FIG. 2.

In use the image capture system is located above source document 12, enabling capture whatever of source document 12 is within its field of view. Source document 12 may be any hard copy document with markings on it that the user is interested in examining in greater detail. Source document 12 might be a map, an architectural drawing, or a page of text. Source document 12 may include or illustrate a number of objects, or subimages, only one of which, the letter X 13, is illustrated in FIG. 1. The captured image will include an image of at least one object of source document 12. The content of source document 12 is not important. Nor is the medium on which source document 12 is fixed important. Source document 12 could be fixed on paper, transparency, cloth, or card board, for example.

Figure 7:
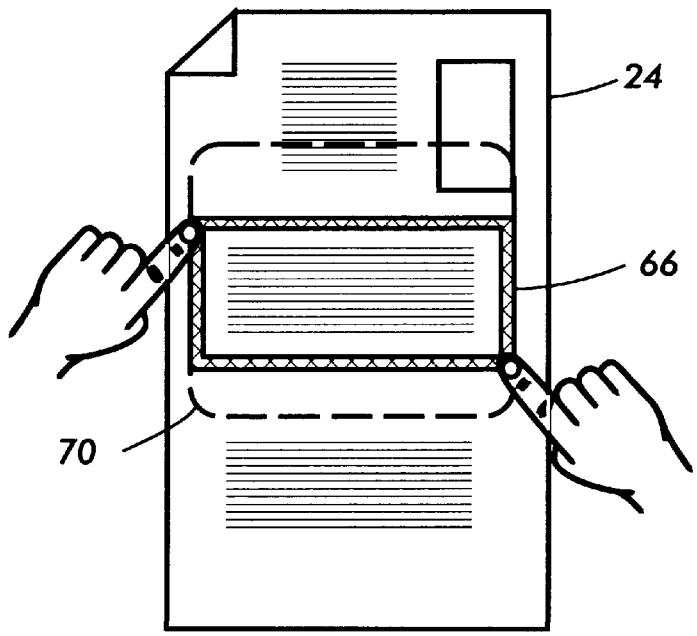
FIG. 7 illustrates a user adjusting a feedback image.

According to the present invention, as shown in FIG. 7, display system 19 projects feedback image 130 onto source document 12 to indicate to the user that portion of source document 12 that is being captured; i.e., the captured image. Feedback image 130 is not only visible to the user, it is also visible to the image capture system. Preferably, feedback image 130 is realized as a gray level rectangle to facilitate detection by the image capture system. Alternatively, portions of feedback image 130 may include coded information, like glyph codes described in U.S. Pat. Nos. 5,168,147; 5,091,066; and 5,128,525. The user may adjust the position of feedback image 130 and/or change its size relative to source document 12 using any number of manual gestures relative to feedback image 130 and within the field of view of the image capture system. For example, these user gestures may include pointing near feedback image 130 at a direction in which the user would like feedback image 130 moved or indicating two points defining new limits for feedback image 130. Suitable methods for tracking finger movement within the field of view of an image capture system are described in European Patent Application No. EP-A-622,722.

Interactive desktop system 10 uses feedback image 130 to automatically control the zoom of the image capture system. As illustrated in FIG. 7, after the user has positioned feedback image 130 on source document 12 within field of view 132 of the image capture system, processor system 30 zooms in field of view 132 until just before feedback image 130 can no longer be seen in field of view 132. In other words, processor system 30 zooms in field of view 132 until feedback image 130 is located at the periphery of the captured image. If feedback image 130 is not visible within the captured image, then processor system 130 zooms out field of view 132 until feedback image 130 is visible just at the periphery of the captured image. Processor system 30 uses feedback image 130 in a similar fashion to control the panning of the image capture system. When one of the sides of the rectangle of feedback image 130 cannot be seen within the captured image, processor system 30 pans the image capture system until the missing side can be seen. To improve system performance during panning, processor system 30 only looks for certain border regions of feedback image 130. The instructions used by processor system 30 to automatically adjust the pan and zoom of the image capture system will be described in detail with respect to FIG. 8.

Interactive desktop system 10 offers its user means other than feedback image 130 to adjust field of view 132 of the image capture system. The user may also adjust field of view 132 by changing the position of the image capture system relative to source document 12 (by adjusting lamp shade 16) and/or by adjusting rotary zoom control 23.

Display system 19 takes the captured image and generates display image 14 and feedback image 130. Unlike source document 12, feedback image 130 and display image 14 are ephemeral, generated by the real time projection of light against surface 15. For this reason, FIG. 1 represents display image 14 using dashed lines, compared to the solid lines of source document 12. Because it is derived from the captured image, display image 14 includes images of the objects within source document 12. Only one of these object images, object image 17, is illustrated in FIG. 1. Display image 14 can also be thought of as a virtual display whose size and resolution are variable in response to user control. Within virtual display 14 the scale of object image 17 remains the same even while the size and resolution of virtual display 14 change. In other words, the size of object image 17 remains constant while the number of pixels used to display it changes. Instructions 100, used by processor system 30, to maintain constant scale of object image 17 will be described below with reference to FIG. 6.

A user's ability to effect how display image 14 is presented is somewhat analogous to the ability to navigate in a virtual world using a flight simulator, although in this case the electronic image, display image 14, is modified based on the user's actions in the real world; i.e., the source document, rather than on the user's position in the virtual world. By adjusting feedback image 130 the user is able to change display image 14, as well as move feedback image 130.

While display image 14 is ephemeral, the information used to create it may be fixed; for example, by storing in memory the digital information needed to generate display image 14. In this case, display image 14 can also be thought of as an electronic document because it will be useful for electronic processes like word processing and printing.

Housing for the Image Capture, Display and Processor Systems

In the embodiment of FIG. 1, interactive desktop system 10 closely resembles a desk lamp, allowing it to be easily installed on existing horizontal work surfaces, like surface 15. Lamp shade 16 acts as a housing for the image capture system and display system 19. Alternatively, lamp shade 16 may house only the image capture system with display system 19 being implemented as described in commonly-owned GB patent application No. 9614694.9 (Agent's ref: R/96007 (JDR)).

Lamp arm 24 is a conventional angle-poise arm, which allows three dimensional adjustment of the position of lamp shade 16. As realized, interactive desktop system 10 permits simple and intuitive adjustment of the field of view of the image capture system. If movement of lamp arm 24 is allowed to alter the angle of lamp shade 16 with respect to surface 15, then processor system 30 must be able to self calibrate to account for the change in angle. Self calibration maintains a constant mapping between the pixels in the field of view of the camera; i.e., the captured image, and the pixels of display image 14. Suitable self calibration methods are disclosed in published European Patent Application EP-A-622,722 and in United Kingdom Patent Application 95 210 72.0.

As is typical with desk lamps, lamp arm 24 is mounted to base 26. Base 26 is preferably larger than conventional lamp bases to allow it to house processor system 30. Processor system 30 is illustrated with dashed lines within base 26 because processor system 30 may not be visible to the user. Alternatively, processing system 30 may be packaged in a standard desktop PC housing, permitting lamp base 26 to be a standard size. In this embodiment, processor system 30 couples to camera 18 and projector 22 via suitable cables (not shown) input to appropriate ports of the desktop PC.

B. The Processor System

Prior to a more detailed discussion of instructions 100 and 150, consider processor system 30. A detailed discussion of one hardware configuration that can be used to realize processor system 30 can be found in P. Horowitz and W. Hill, *The Art of Electronics*, 2nd Ed., Ch. 10, Cambridge University Press, 1989.

Figure 2:
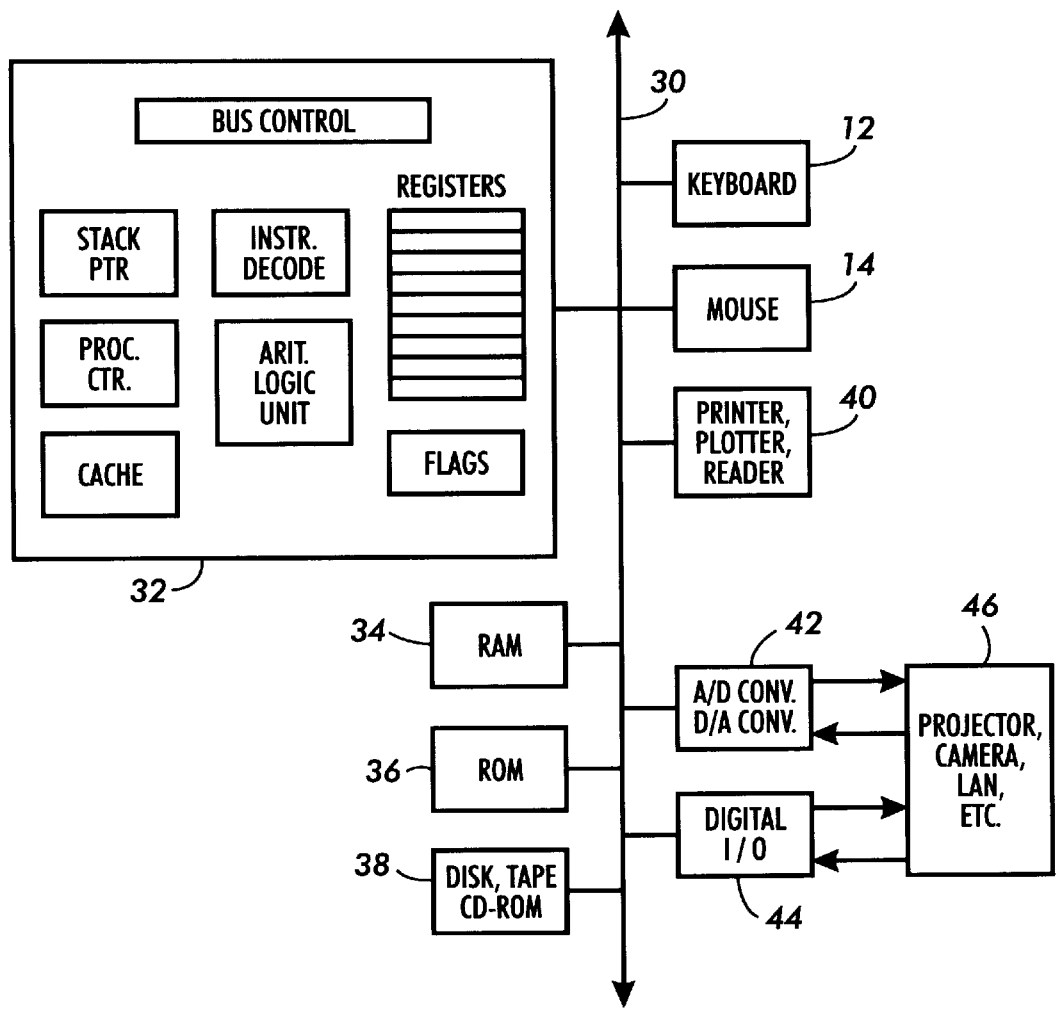
FIG. 2 is a block diagram of the processor system of the interactive desktop system.

Briefly described, as illustrated in FIG. 2, processor system 30 includes processor 32, which controls and coordinates the operations of interactive desktop system 10 in response to user inputs. Processor 32 determines and takes the appropriate action in response to each user input by executing instructions including instructions 100 and 150. Processor system 30 stores instructions electronically, either within memory or on other machine readable media inserted in a disk, tape, or CD-ROM drive 34. Typically, operating instructions for processor 32 are stored in solid state memory, allowing frequent and rapid access to the instructions. Semiconductor logic devices that can be used to realize memory include read only memories (ROM) 36 or random access memories (RAM) 38. Other types of memory that could be used, but are not illustrated, include dynamic random access memories (DRAM), programmable read only memories (PROM), erasable programmable read only memories (EPROM), and electrically erasable programmable read only memories (EEPROM), such as flash memories.

Processor system 30 provides the user multiple avenues to input data. Keyboard 40 allows the user to input data 30 by typing. By moving mouse 42 the user is able to move a pointer displayed on display image 14. The user may also input data stored on a machine readable medium, such as a floppy disk, by inserting it into drive 34. Processor system 30 may also receive input from external sources 48, including projector 22, camera 18, and any network to which system 30 is connected. Preferably, processor system 30 includes a conventional internal driver card (not shown) and appropriate software (such as Netware, available from Novell Corp.) enable it to form part of a local (LAN) or wide area network (WAN), as is well known in the art. Processor system 30 may also provide multiple output points, like a printer, plotter, and reader 43.

Processor 32 communicates with the various components of system 30 over common bus 31. Converters 44 and digital input/output devices 46 assist in the communication between processor 32 and external input sources 48.

Processor system 30 may be realized as a computer running Windows™ and equipped with a frame grabber board and appropriate interfacing circuitry; for example, like that discussed by B. Jähne B. in *Digital Image Processing*, Appendix B, Springer-Verlag, Heidelberg, 1991. Alternatively, published European application EP-A-622, 722 describes in detail a hardware configuration that may be employed to realize processor system 30 if modified so that the interfacing circuitry is housed in lamp base 26 and coupled to the remainder of processor system 30. Camera 18 and video projector 22 are then coupled to the image processing hardware described in detail in that application.

In implementing the present invention, image processing techniques described in EP-A-622,722 may be used, modified, as appropriate and/or as described below.

C. Alternative Housings and Frames

Figure 3A:
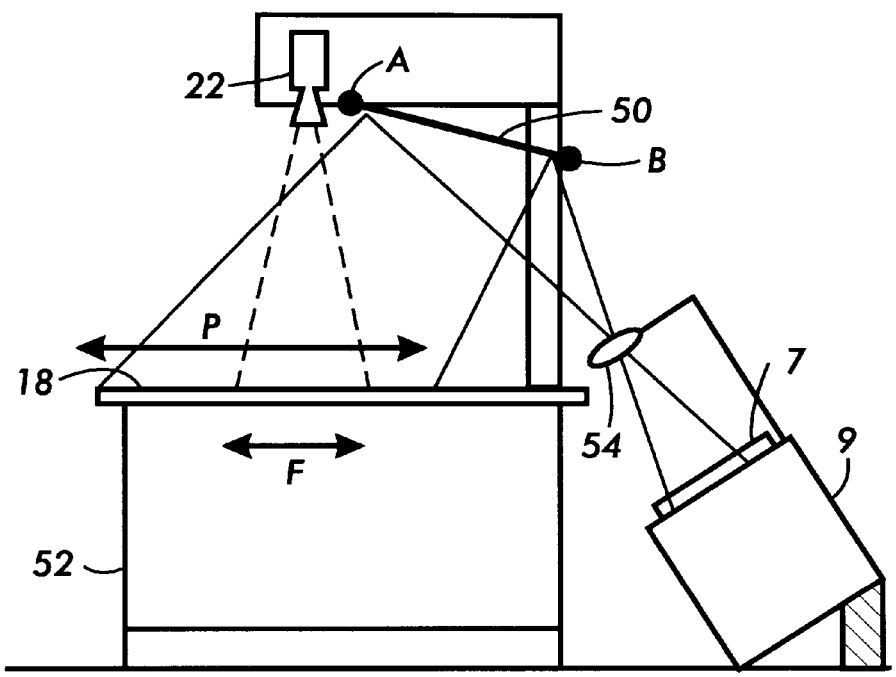
FIG. 3(a) illustrates a first alternative embodiment of the interactive desktop system.

Housing both camera 18 and display system 19 in lamp shade 16 can result in a lamp shade that is quite large and/or radiates uncomfortable amounts of heat. FIG. 3(a) illustrates an alternative embodiment 10a of interactive desktop system 10 that addresses these problems. Rather than housing both camera 18 and display system 19 in a single housing, display system 19 is located below and to the side of surface 15. In embodiment 10a display system 19 may include a standard overhead projector 56 having a lens 54 for adjusting focus. LCD matrix 22 rests above the upper surface of the projector 56. Attached to camera housing 50, mirror 52 reflects display image 14 from display system 19 onto surface 15. Mirror 52 is hinged at A and a screw adjustment at B allows the angle of mirror 52 to be adjusted so that display image 14 is projected onto the appropriate area of surface 15. Thus, display system 19 projects display image 14, having width P, back down onto the same region of surface 15 as scanned by camera 18. This scanned region has a width F. Note that FIG. 3(a) exaggerates the upward angle of inclination of display system 19 toward mirror 52.

Display image 14 must be reversed to counter the effects of reflection by a single mirror 52. Most projectors and LCD panels having this reversal capability built in. Also, steps may need to be taken to minimize the keystoning (foreshortening), distortion, and focusing problems caused by projecting display image 14 at an angle to the vertical. Again, some self-contained projectors include the means to displace lens 54 with respect to the LCD array generating the display image 14. This will reduce keystoning, a small amount of which a user can tolerate without difficulty.

Figure 3B:
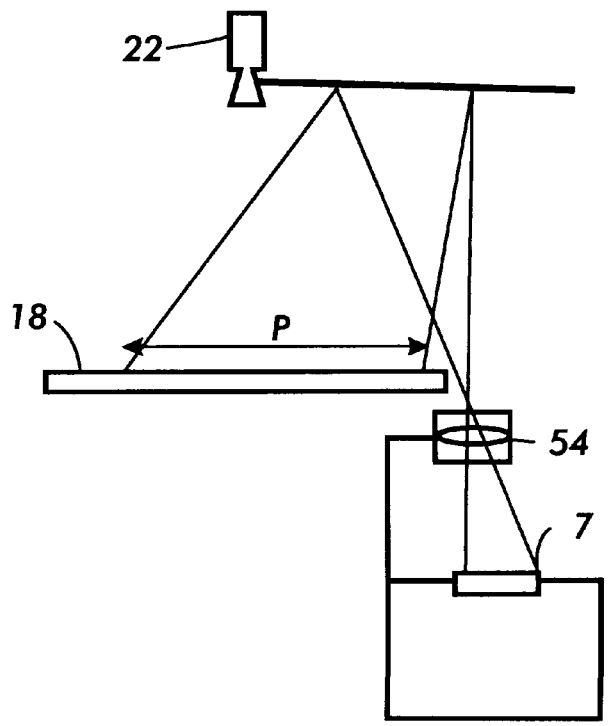
FIG. 3(b) illustrates a second alternative embodiment of the interactive desktop system.

FIG. 3(*b*) illustrates yet another embodiment 10*b* of interactive desktop system 10. Like embodiment 10*a*, embodiment 10*b* also addresses the size and heat problems that can arise from housing the image capture system and display system 19 in a single housing. Embodiment 10*b* resembles embodiment 10*a*, differing in that display system 19 is located underneath surface 15, rather than to the side of it. Display system 19 projects display image 14 through a hole in surface 15. By reducing the angle to the vertical at which display image 14 is projected to mirror 52, embodiment 10*b* reduces keystoning, focusing, and foreshortening problems as compared to embodiment 10*a*. In embodiment 10*b*, a projector with means to displace lens 54 with respect to LCD array 22 may be sufficient to eradicate keystoning altogether.

Figure 4A:
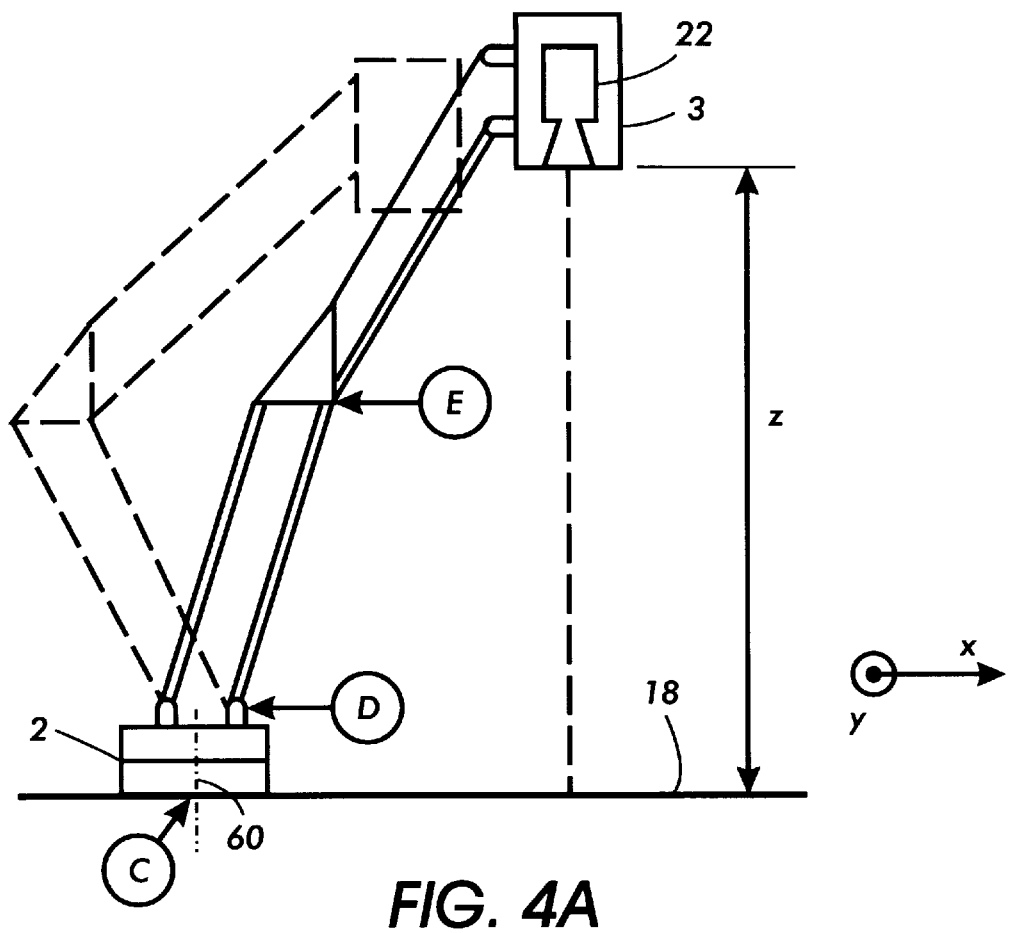
FIG. 4(a) illustrates a third alternative embodiment of the interactive desktop system.
Figure 4B:
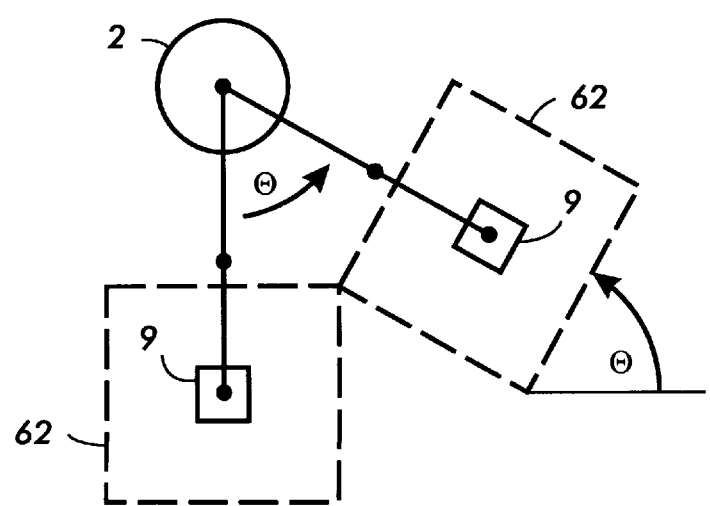
FIG. 4(b) illustrates a plan view of the third alternative embodiment of the interactive desktop system.

FIG. 4 illustrates embodiment 10*c* of interactive desktop system 10, which resembles the embodiment discussed previously with respect to FIG. 1. Embodiment 10*c* projects display image 14 with arbitrary size, resolution and position. Lamp base 26 is fixed, allowing lamp housing 16 to rotate about axis 60. Lamp arm 24 restricts the movement of lamp housing 16 to purely up and down. In other words, the angle of the optical axis of camera 18 and display system 19 to the vertical is zero, perpendicular to surface 15. This eliminates the need to perform an inverse projective transform to produce an undistorted display image 14, as is the case with the embodiment of FIG. 1.

Embodiment 10*c* includes a number of shaft encoders 58 attached to lamp arm 24 and lamp base 26. Each shaft encoder 58 outputs an electrical signal indicative of change in angular position, which is coupled to processor system 30. Using this information, processor system 30 is able to adjust the characteristics of display image 14 to provide the illusion of its having arbitrary size and resolution. Shaft encoders 58 are preferably located at points C, D, and E on lamp arm 24. Shaft encoders 58 enable interactive desktop system 10*c* to determine the position of lamp housing 16 above surface 15, as well as the two dimensional position of lamp housing 16 relative to the plane of surface 15. The distance of lamp housing 16 above surface 15 is represented by z, while x and y represent the position of the lamp housing 16 within the plane of surface 15. Alternative means may be used for measuring the distance z, such as disposing on lamp housing 16 an ultrasonic transducer like those employed in autofocus cameras.

FIG. 4(*b*) is a plan view of interactive desktop system 10*c*, showing two different positions of lamp arm 24 and camera 18. As camera 18 and lamp arm 24 rotate θ degrees from position 24*c* to position 24*d*, display image 14 also rotates from position 14*c* to 14*d* by degrees with respect to the orthogonal axes of surface 15. If desired, processor system 30 may compensate for this rotation by applying a reverse rotation of −θ degrees before displaying display image 14.

Figure 5:
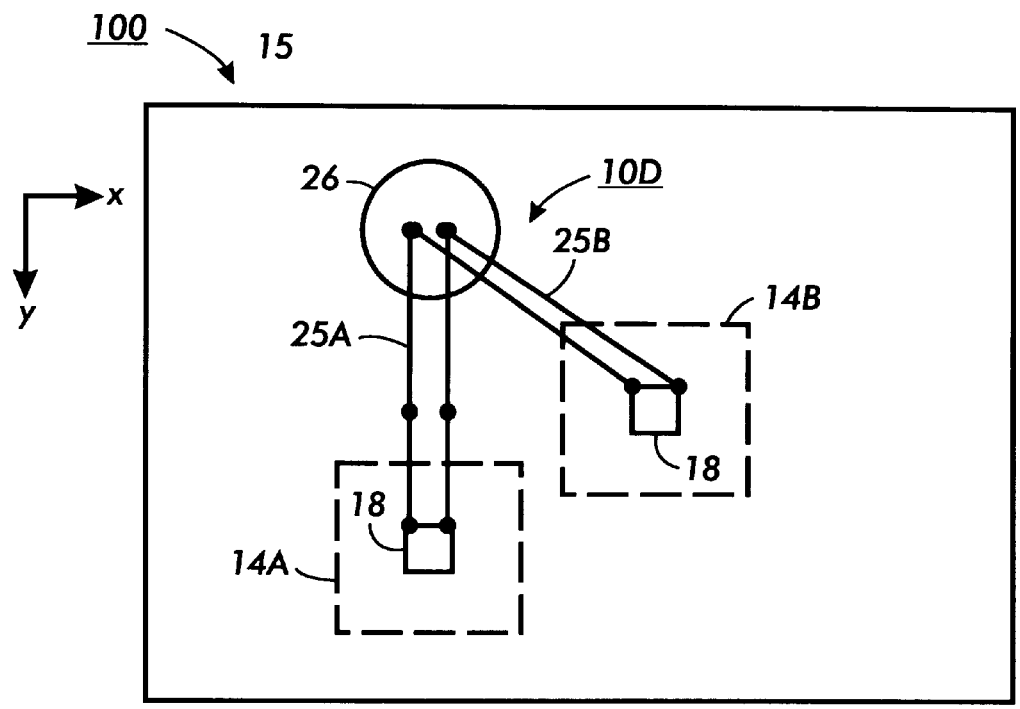
FIG. 5 illustrates a fourth alternative embodiment of the interactive desktop system.

FIG. 5 illustrates embodiment 10*d* of interactive desktop system 10. System 10*d* also employs a fixed swiveling lamp base 26. Without performing a reverse rotation prior to display of display image 14, system 10*d* present display image 14 parallel to the orthogonal axes of surface 15. Interactive desktop system 10*d* does so using lamp arm 25, which has a complex double linkage. Thus, as arm 25 moves from position 25*a* to 25*b*, display image 14 moves from position 14*a* to 14*b* without rotating with respect to the orthogonal axes of surface 15.

Figure 6:
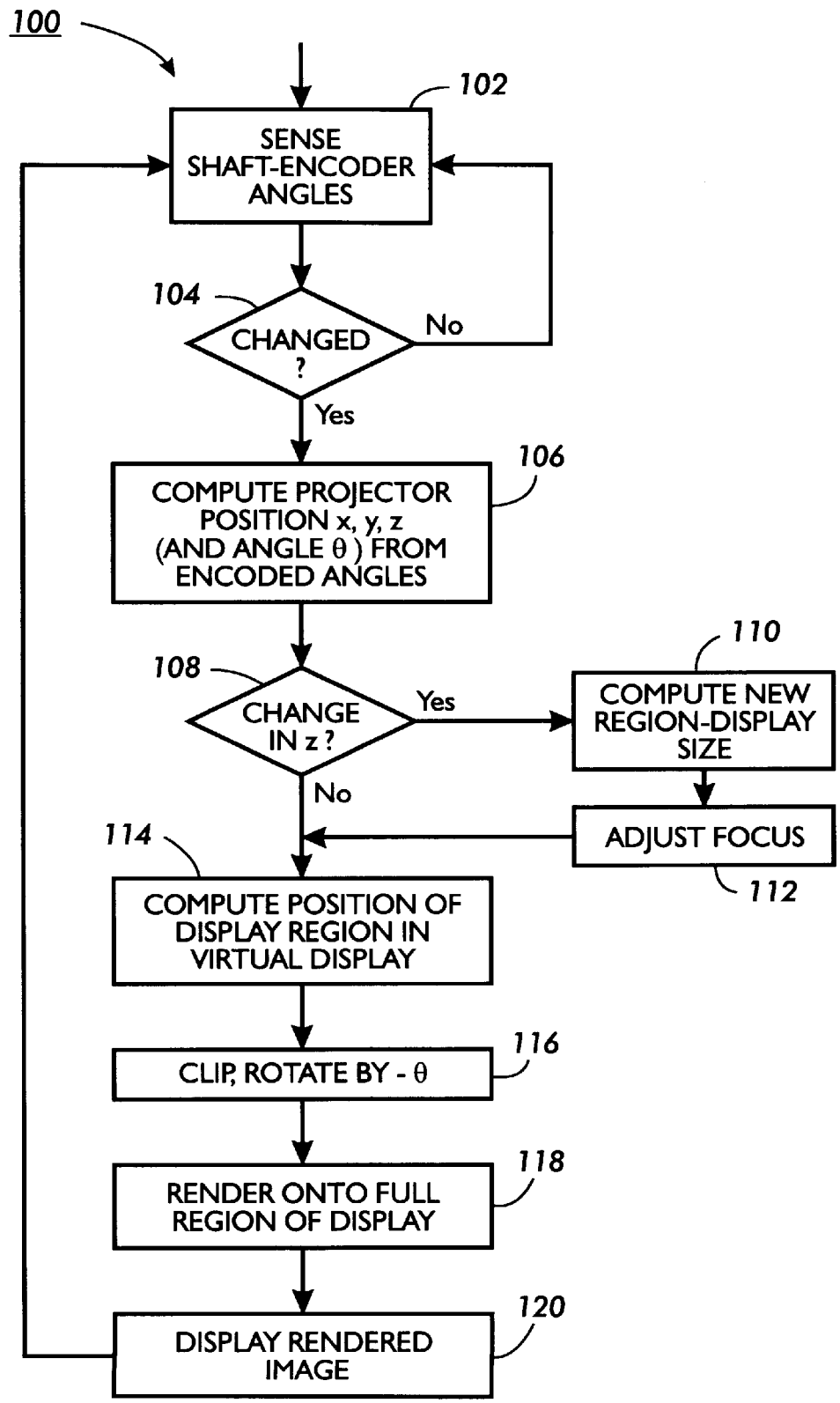
FIG. 6 is a flow chart of instructions for automatically adjusting the size and/or resolution of the display image in response to user actions changing the field of view of image capture system.

D. Automatically Adjusting Display Image Characteristics in Response to User Changes to the Camera Field of View FIG. 6 illustrates in flow diagram form instructions 100 for modifying the size and resolution of display image 14 in response to a change in either the position of the image capture system or zoom setting of the image capture system. Instructions 100 enable interactive desktop system 10 to give its user the impression of arbitrarily large size and arbitrarily high resolution of display image 14 because changes in display resolution and size do not change the scale of object image 17. Instructions 100 may be stored in solid state memory, like ROM 36 or RAM 38, or on machine readable media readable by drive 34. Instructions 100 may be realized in any computer language, including C++.

Processor 32 begins execution of instructions 100 with step 102. During steps 102 and 104 processor 32 waits for any change in the signals output by shaft encoders 58, by rotary zoom control 23, or by the electronic signals provided by processor system 30 to control the image capture system zoom. Whenever it detects such a change, processor 32 branches from step 104 to step 106.

During step 106 processor 32 to determines the x, y, and z position of the image capture system using the shaft encoder signals. Processor 32 does so using well known geometric relations. Subsequently, processor 32 examines the z value to determine whether the height of the image capture system above surface 15 has changed. During step 108 processor 32 also determines whether the zoom setting of the image capture system has changed. This is easily done by comparing the current value of the setting to a previous value stored in memory. If either the value of z or the zoom control setting has changed, processor 32 advances to step 110 from step 108.

During step 110 processor 32 determines the current size of the captured image because the user's actions may have changed it. Processor 32 uses this information during step 112 to adjust the focus of display system 19 to insure that display image 14 will be sharp. That done, processor 32 advances to step 114.

With step 114, processor 32 and turns its attention to the location of the captured image within source document 12. Stated another way, during this step processor 32 determines what part of source document 12 the user has selected as the captured image. Processor 32 responds to a change during step 116 by doing two things. Processor 32 grabs the captured image and determines whether this new captured image has been rotated with respect to the previous captured image. If so, processor 32 applies a reverse rotation to the captured image, if necessary, to insure that display image 14 will be presented parallel to the orthogonal axes of surface 15. Processor 32 then advances to step 118.

During step 118 processor 32 adjusts the size of display image 14 so that the scale of object image 17 remains the same and is displayed with the new resolution dictated by the user's actions. In other words, during step 118 processor 32 generates display image 14 using the captured image and modifying its size. These changes will change the number of pixels per inch at which object image 17 is displayed and the size of display image 14, but will not change the size of object image 17. Its appropriate size determined, display image 14 is displayed during step 120. That done, processor 32 returns to step 102 to await the next change in the position of housing 16 or in the setting of rotary zoom control 23.

Figure 8:
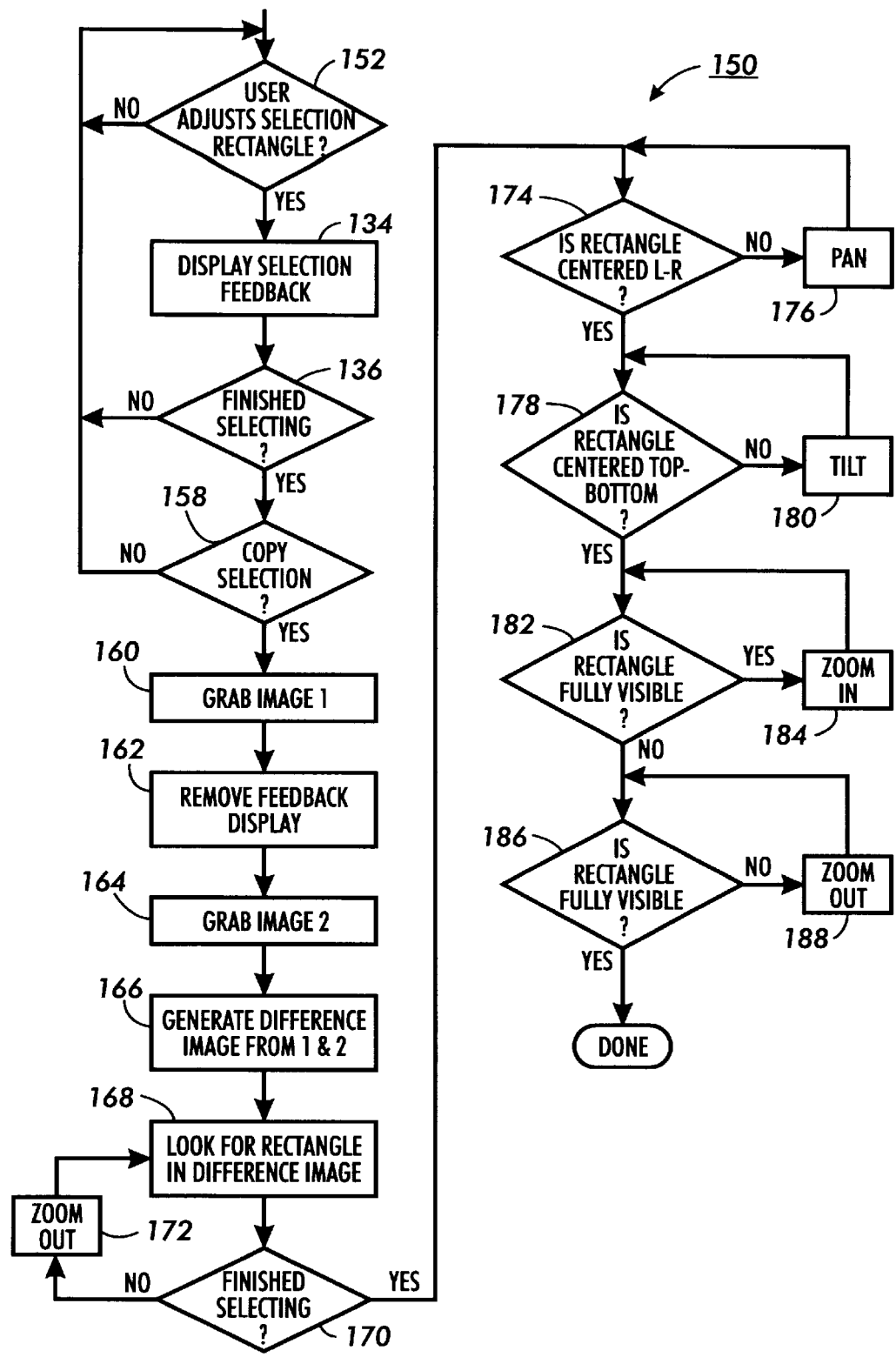
FIG. 8 is a flow chart of the instructions for automatically adjusting camera zoom and pan functions in response to user adjustment of the feedback image.

E. Automatically Adjusting Camera Pan and Zoom Functions in Response to User Adjustment of a Feedback Image FIG. 8 illustrates in flow diagram form instructions 150 for automatically adjusting the pan and zoom functions of the image capture system in response to user adjustment of feedback image 130. Briefly described, instructions 150 begin by recognizing an adjustment to feedback image 130, possibly coupled with a request to change display image 14. In response to such a request, first during steps 160–172 processor 32 adjusts the zoom of the image capture system to bring feedback image 130 into field of view 132. Next, during steps 174–180 processor 32 adjusts the pan of the image capture system to center feedback image 130 within field of view 132. Finally, during steps 182–188 processor 32 readjusts the zoom, if necessary, so that feedback image 130 is located just at the perimeter of field of view 132. Instructions 150 may be stored in solid state memory, like ROM 36 or RAM 38, or on machine readable media inserted into drive 34. Instructions 150 may be realized in any computer language, including C++.

Processor 32 begins execution of instructions 150 with step 152. During step 152, processor 32 awaits a request from the user for some change in position and/or size of feedback image 130 relative to source document 12. The user's request will indicate both the size and location of feedback image 130. Processor 32 may recognize such a request using the finger tracking methods described in European Patent Application No. EP-A-622,722. Having recognized a desired change, processor 32 advances to step 154 make the desired change. Given recognition of the type of change and feedback image dimensions and location, adjusting the size and location of feedback image 130 is obvious to those of ordinary skill. After adjusting its size and location, feedback image 130 is displayed to the user. If the user requests no further changes to feedback image 130, processor 32 branches from step 156 to step 158.

Processor 32 waits during step 158 for a request from the user to copy the objects of source document 12 surrounded by feedback image 130. Such a request may also be indicated via finger movements in field of view 132 using the techniques described in European Patent Application No. EP-A-622,722. In response to such a request, processor 32 begins the process of appropriately adjusting the zoom of the image capture system. During step 160 processor 32 causes the image capture system to capture the image currently within its field of view 132, which includes feedback image 130. Call this captured image IMAGE1. Subsequently, during step 162 processor 32 causes display system 19 to temporarily stop displaying feedback image 130, thereby removing it from field of view 132. Then, processor 32 instructs the image capture system to grab the image currently within field of view 132. This produces during step 164 a second captured image; call this one IMAGE2. Processor 32 next generates a difference image using both IMAGE1 and IMAGE2 and techniques well known to those of ordinary skill, which will not be described in detail herein. Processor 32 then advances to step 168 from step 166.

During step 168 processor 32 searches for feedback image 130 within the difference image. Processor 32 does so using well known pattern recognition techniques, which will not be described in detail herein. If processor 32 does not detect feedback image 130 within the difference image, then during step 172 the zoom of the image capture system is adjusted to increase the portion of source document 12 within field of view 132. Processor 32 then repeats execution of steps 160, 162, 164, 166, and 168 until feedback image 130 is located within the difference image. When that occurs, processor 32 branches to step 174 from step 170.

With step 174, processor 32 begins the process of automatically adjusting the pan and tilt of the image capture system so that feedback image 130 appears at the perimeter of field of view 132. Processor 32 begins by determining whether feedback image 130 is centered from left to right within the difference image. If not, processor 32 alters the pan setting of the image capture system and generates a new difference image using the same process described with respect to steps 160, 162, 164 and 166. Processor 32 then branches back to step 174 and repeats execution of steps 174 and 176 until processor 32 field of view 132 is adjusted such that feedback image 130 is centered from left to right within the difference image. When that occurs processor 32 advances to step 178 and determines whether feedback image 130 is centered from top to bottom within the difference image. If not, processor 32 adjusts the tilt of the image capture system, generates a new difference image and returns to step 178. Processor 32 branches through the loop of steps 178 and 180 until feedback image 130 is centered from top to bottom within the difference image. When that is done, processor 32 advances to step 182.

With step 182 processor begins readjustment of the zoom of the image capture system so that feedback image 130 will be located at the perimeter of the captured image and display image 14. Processor 32 determines during step 182 whether feedback image 130 is fully visible within the difference image. If not, processor 32 zooms in the image capture system, generates a new difference image and returns to step 182. Processor 32 executes the loop of instructions 182 and 184 until feedback image 130 is no longer fully visible within the difference image. When that occurs, processor 32 advances to step 186. Initially, during step 186 processor 32 should discover that feedback image 130 is not fully visible within the difference image. In response during step 188 processor 32 slightly zooms out the image capture system, generates a new difference image and returns to step 186. When processor 32 discovers during step 186 that feedback image 130 is again fully visible within the difference image, feedback image should be just fully visible; i.e., the perimeter of the field of view will be defined by feedback image 130. When that occurs, processor 32 deems satisfactory the pan and zoom settings of the image capture system. In response, processor 32 directs display system 19 to take the current captured image and modify display image 14. Instructions 100 can be used to do this. Afterward, processor 32 returns to step 152 to await new user input.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. The interactive desktop system comprising:

a) an image capture system for capturing a captured image in a field of view of the image capture system, the captured image including an image of a portion of a source document, the image capture system having electronically controllable pan and zoom functions for adjusting the field of view;

b) a display system for displaying a feedback image on the source document, the feedback image indicating to a user the captured image, the feedback image being visible to the image capture system; and c) a processor system coupled to the image capture system and the display system, the processor system responding to a user adjustment of the feedback image by adjusting at least a one of the pan function and the zoom function, wherein the processor system comprises:

c1) a processor for executing instructions;

c2) a memory coupled to the processor for storing the instructions in machine readable form, the instructions comprising the steps of:

A) capturing a first image in the field of view of the image capture system while the feedback image is being displayed on the source document;

B) capturing a second image in the field of view of the image capture system while the feedback image is not being displayed on the source document;

C) generating a difference image from the first image and the second image;

D) searching for the feedback image in the difference image; and

E) when the feedback image is found in the difference image adjusting at least a one of the pan and zoom controls of the image capture to center the feedback image within the difference image.

2. The interactive desktop system of claim 1 wherein the instruction of step D) comprises the substeps of:

i) adjusting the zoom control to zoom out the field of view of the image capture system; and ii) repeating steps A) through Di) until the feedback image is found in the difference image.

3. The interactive desktop system of claim 1 wherein the instruction of step E) comprises the substeps of:

i) adjusting the pan control to pan the field of view of the image capture system until the feedback image is centered left to right within the difference image; and ii) adjusting the pan control to tilt the field of view of the image capture system until the feedback image is centered top to bottom within the difference image.

4. The interactive desktop system of claim 1 where the instructions further comprise the step of:

F) after step E) adjusting the zoom control until the feedback image is just fully visible within the difference image.

5. The interactive desktop system of claim 2 wherein the instruction of step E) comprises the substeps of:

i) adjusting the pan control to pan the field of view of the image capture system until the feedback image is centered left to right within the difference image; and ii) adjusting the pan control to tilt the field of view of the image capture system until the feedback image is centered top to bottom within the difference image.

6. The interactive desktop system of claim 5 where the instructions further comprise the step of:

F) after step E) adjusting the zoom control until the feedback image is just fully visible within the difference image.

7. An article of manufacture for use with an interactive desktop system, the interactive desktop system including a processor system, an image capture system, and a display system, the image capture system capturing a captured image in a field of view of the image capture system, the captured image including an image of a portion of a source document, the image capture system having electronically controllable pan and zoom functions for adjusting the field of view, the display system displaying a feedback image on the source document, the feedback image indicating to a user the captured image, the feedback image being visible to the image capture system, the processor system being coupled to the image capture system and the display system, the article of manufacture comprising:

a) a memory;

b) instructions stored in the memory in machine form readable by the processor system, the instructions causing the processor system to respond to a user adjustment of the feedback image by adjusting at least a one of the pan function and the zoom function, the instructions comprising the steps of:

1) capturing a first image in the field of view of the image capture system while the feedback image is being displayed on the source document;

2) capturing a second image in the field of view of the image capture system while the feedback image is not being displayed on the source document;

3) generating a difference image from the first image and the second image;

4) searching for the feedback image in the difference image; and 5) when the feedback image is found in the difference image adjusting at least a one of the pan and zoom controls of the image capture to center the feedback image within the difference image.

8. The article of manufacture of claim 7 wherein step 4) comprises the substeps of:

A) adjusting the zoom control to zoom out the field of view of the image capture system; and B) repeating steps 1) through 4A) until the feedback image is found in the difference image.

9. The article of manufacture of claim 7 wherein the instruction of step 5) comprises the substeps of:

A) adjusting the pan control to pan the field of view of the image capture system until the feedback image is centered left to right within the difference image; and B) adjusting the pan control to tilt the field of view of the image capture system until the feedback image is centered top to bottom within the difference image.

10. The article of manufacture of claim 7 wherein the instructions further comprise the step of:

6) after step 5) adjusting the zoom control until the feedback image is just fully visible within the difference image.

11. The article of manufacture of claim 8 wherein the instruction of step 5) comprises the substeps of:

A) adjusting the pan control to pan the field of view of the image capture system until the feedback image is centered left to right within the difference image; and B) adjusting the pan control to tilt the field of view of the image capture system until the feedback image is centered top to bottom within the difference image.

12. The article of manufacture of claim 11 wherein the instructions further comprise the step of:

6) after step 5) adjusting the zoom control until the feedback image is just fully visible within the difference image.

13. A method of scanning relevant portions of a source document with an image capture system, comprising the steps of:

1) capturing a first image in a field of view of the image capture system while a feedback image is being displayed on the source document;

2) capturing a second image in the field of view of the image capture system while the feedback image is not being displayed on the source document;

3) generating a difference image from the first image and the second image;

4) searching for the feedback image in the difference image; and 5) when the feedback image is found in the difference image adjusting at least a one of the pan and zoom controls of the image capture to center the feedback image within the difference image.

14. The method of claim 13 wherein step 4) comprises the substeps of:

A) adjusting the zoom control to zoom out the field of view of the image capture system; and B) repeating steps 1) through 4A) until the feedback image is found in the difference image.

15. The method of claim 13 wherein step 5) comprises the substeps of:

A) adjusting the pan control to pan the field of view of the image capture system until the feedback image is centered left to right within the difference image; and B) adjusting the pan control to tilt the field of view of the image capture system until the feedback image is centered top to bottom within the difference image.

16. The method of claim 13 further comprising the step of:

6) after step 5) adjusting the zoom control until the feedback image is just fully visible within the difference image.

17. The method of claim 13 wherein step 5) comprises the substeps of:

A) adjusting the pan control to pan the field of view of the image capture system until the feedback image is centered left to right within the difference image; and B) adjusting the pan control to tilt the field of view of the image capture system until the feedback image is centered top to bottom within the difference image.

18. The method of claim 17, further comprising the step of:

6) after step 5) adjusting the zoom control until the feedback image is just fully visible within the difference image.

* * * * *